United States Patent [19]
Bevis et al.

[11] Patent Number: 5,241,366
[45] Date of Patent: Aug. 31, 1993

[54] THIN FILM THICKNESS MONITOR

[75] Inventors: Christopher F. Bevis, San Francisco; Armand P. Neukermans, Palo Alto; Stanley E. Stokowski, Danville; Ralph C. Wolf, Palo Alto; Matthew B. Lutzker, Atherton, all of Calif.

[73] Assignee: Tencor Instruments, Mountain View, Calif.

[21] Appl. No.: 846,207

[22] Filed: Mar. 4, 1992

[51] Int. Cl.$^5$ ............................................. G01B 11/06
[52] U.S. Cl. ................................... 356/382; 356/243; 356/357
[58] Field of Search ............... 356/381, 382, 355, 357, 356/243, 445, 448; 250/560

[56] References Cited

U.S. PATENT DOCUMENTS

| | | | |
|---|---|---|---|
| 4,355,903 | 10/1982 | Sandercock | 356/382 |
| 4,453,828 | 6/1984 | Hershel et al. | 356/382 |
| 4,676,647 | 6/1987 | Kikkawa et al. | 356/382 |

Primary Examiner—Richard A. Rosenberger
Assistant Examiner—Hoa Q. Pham
Attorney, Agent, or Firm—Schneck & McHugh

[57] ABSTRACT

A thin film thickness monitor using successive reflection of a polychromatic light beam off of reference thin film of variable optical thickness and a sample thin film whose thickness is to be determined, in which a monochromatic light source is used beforehand to first determine the actual optical thickness of the reference thin film at each relative position of the beam and reference thin film. In one embodiment, the ratio S/R of detected light intensity S from the sample thin film and detected light intensity R from the reference thin film is found for each relative position and the position at which the ratio is a maximum is determined. In another embodiment, this ratio is corrected by a corresponding ratio $S_1/R_1$ derived from a bare wafer substrate. The sample can then be located behind additional optical surfaces, such as a vacuum port without causing substantial errors. In yet a third embodiment, the detected light intensity R2 from two reflections off of the reference thin film is used in place of intensity R, allowing very thin films to be accurately measured.

38 Claims, 8 Drawing Sheets

THIN FILM THICKNESS MONITOR

TECHNICAL FIELD

The present invention relates to optical instruments for measuring thickness of thin film materials on a substrate, and in particular to such instruments that are characterized by the use of light interference to make such measurement.

BACKGROUND ART

In U.S. Pat. No. 4,355,903, Sandercock describes a thin film thickness monitor, seen here in FIG. 1, in which a light beam 11 is successively reflected from a reference thin film 13 of varying optical thickness and then from a sample thin film 15 of unknown optical thickness. A polychromatic light source, such as an incandescent lamp 17, provides a light beam 11 directed towards the reference thin film 13 with a broad wavelength range spanning the visible and near infrared regions (0.4–3.0 μm). The reference thin film 13 is a transparent dielectric film layer 19 in the form of a semicircular ramp or wedge formed on a flat semicircular substrate 21 in turn attached to a flat circular metal disc 23. The thickness of wedge 19 varies in a known manner with the angle of rotation $\Theta$ of the disc 23, preferably linearly, from an initial zero thickness up to about 3.0 μm. A number of film and substrate materials, including silicon dioxide on silicon, are suggested. Preferably, the reference thin film 19 and substrate 21 will be chosen to be identical in material to the sample thin film 15 and substrate 25. The light beam 11 is imaged at nearly normal incidence ($\Theta_1 \leq 15°$) as a spot 26 on the wedge 19. The reflected light 27 is then imaged onto the sample thin film 15 and reflected from there to a light detector 29 with a broad wavelength response, preferably, one with a flat response in the 0.4–3.0 μm wavelength range of the light source.

In general, light incident on a thin film supported on an opaque substrate is reflected partly from the film-air interface and partly from the substrate-film interface. As a result of the interference that occurs between the reflected beams, the reflected intensity will show an oscillatory dependence on the wavelength of the incident light. The reflectivity $R(\lambda)$ has certain maxima at wavelengths $\lambda_{max}$ and minima at wavelengths $\lambda_{min}$ that depend on the optical thickness n·d of the thin film and on the incidence angle $\Theta$ of the light. In the case of successive reflections from reference and sample thin films, 13 and 15, whenever the optical thicknesses (and incidence angles) are substantially the same, the set of wavelengths strongly reflected by the reference 13 will correlate strongly with the set of wavelengths strongly reflected by the sample film 15. Whenever the optical thicknesses are not substantially equal, there will be no general coincidence between the wavelengths of maximum reflectivity for the reference 13 and those for the sample 15. Accordingly, the light intensity observed by the detector 29 after both reflections will be a maximum, whenever the optical thicknesses are equal, provided the incidence angles are also equal. In the Sandercock apparatus, the circular metal disc 23 holding the reference thin film wedge 19 and substrate 21 is attached to a motor shaft 31 of a motor 33 that rotates the disc 23 at a uniform rate, and thereby turns the reference thin film wedge 19 relative to the light beam 11, so that the optical thickness of the spot 26 on the wedge 19 illuminated by the light beam 11 varies, preferably linearly, with time. Accordingly, the thickness of the sample thin film 15 is determinable from the elapsed time between the start 35 of the wedge 19, seen in a top plan view in FIG. 1A, and the detection of maximum intensity. The surface of the disc 23 not covered by the wedge may be coated black in order to better determine the exact starting point 35 of the wedge 19 from a sharp change in reflectivity as the disc 23 rotates.

The above described apparatus is based upon a number of assumptions that are not always valid in every circumstance, and which therefore limit the applicability of the device in a number of important cases. A number of elements in the system require a flat spectral response over a broad range of wavelengths. However, most lamps do not provide illumination which is completely flat as a function of wavelength. Many of the more sensitive light detectors lack even a stable, D.C. response with respect to time, not to mention a flat response over the desired wavelength range. These problems give rise to substantial distortion and false peaks in the retrieved signal. Further, the technique assumes that the sample substrate itself has a flat reflectivity characteristic with respect to wavelength, yet most substrates preferably reflect some wavelengths to a greater degree than others, thereby contributing their own distortion to the signal.

Another assumption is that the wedge used for the reference thin film has a constant slope so that the film thickness is precisely known for a given rotational angle. However, even though the linearity of wedges can be made better than 2%, process variations may prevent greater linearity from being achieved. Further, the actual slope of even a linear wedge may not be known with precision because of uncertainties in the etch rate or other process parameters.

The technique also assumes that the true position of the maximum reflected intensity is precisely known. However, the maxima are fairly flat and so the measured peak position at the detector may be affected by small amounts of noise in the light source output, detector response or the like. Even when the peak position is known, for thin films with thicknesses less than about 150 or 200 nm the measured peak position begins to deviate from the peak position expected from interference effects, until at thicknesses on the order of tens of nanometers, the peak position is no longer representative of thickness. Accordingly, the device is applicable only for films having thicknesses of about 150 or 200 nm and greater.

There is another assumption that there are no intervening optical surfaces contributing to a spectral response in the light path other than the two thin films. However, in some situations it is necessary to make observations in a vacuum chamber, which necessitates coupling the light through a vacuum port. This may contribute one or more observed peaks in addition to the one intended for measurement. Alternatively, the sample may contain multiple thin films which cause multiple maxima at different wavelengths.

Despite these shortcomings, the original Sandercock device has had great utility and been highly successful for many years. However, as the semiconductor industry strives for even greater precision, uses thinner and thinner films and employs one film on top of another, its limitations will become more apparent and the need for improvements in thin film measuring equipment will become more critical.

Accordingly, it is an object of the present invention to provide a thin film thickness monitor and method of measuring which still gives an accurate sample thin film measurement even when the assumptions described above are not fully met, as for example, when the reference thin film thickness does not vary precisely linearly or when the sample substrate does not have a flat spectral response.

Another object of the invention is to provide a thin film thickness monitor capable of accurately measuring sample thicknesses of less than 200 nm.

A further object of the invention is to provide a thin film thickness monitor that can make measurements through additional optical surfaces, such as a vacuum chamber port.

DISCLOSURE OF THE INVENTION

The above objects have been met by a thin film thickness monitor having two light sources, one being a monochromatic light source, such as a gas laser or a laser diode, the other being a polychromatic light source, such as an incandescent lamp. The polychromatic light source is used, as before, in a successive reflection off of a reference thin film of variable optical thickness and a sample thin film of unknown optical thickness, the overall reflectance observed by a sample detector being at an extremum when the two thicknesses are the same. The monochromatic light source is used to accurately determine the actual optical thickness of the reference film as a function of angular position instead of relying on its supposedly linear variation in optical thickness and its uniform motion by a motor. A processor calculates the actual optical thickness of the reference film from the maximum and minimum intensity positions observed by a reference detector, and stores the set of calculated thickness values in a memory for reference. The reference thin film can be a single semicircular wedge, as before, can be a single circular wedge extending nearly 360° around the rotation axis, or can be two semicircular wedges instead of one, the two wedges being either identical or covering different ranges of thickness.

The objects are also met with a method in which a bare substrate is first placed in the sample position and measured as if it were an unknown film. The reflectance values for each reference thin film angle are stored in memory. Then the bare substrate is replaced with a similar substrate containing the thin film to be measured. The reflectance values for each reference thin film angle are again measured, then a processor calculates the ratio of the sample thin film reflectance values to the bare wafer reflectance values stored in memory. This modified response curve is used as though it were the actual sample measurement to determine the extremum position where the sample thin film thickness equals the reference thin film thickness. The technique can be extended to thin film thicknesses below 200 nm, by first storing in memory the actual reflectance response observed for each of several well calibrated thin films placed in the sample position. The values stored could be either the reference film angular position at peak overall reflectance for each calibrated thin film sample, or a value indicative of the reflectance curve's shape as a function of reference film position for each calibrated thin film sample, or both. When subsequently measuring an unknown sample thin film, which is first determined to be less than 200 nm thick, reference can be then made to the stored values in the memory for comparison of the sample with the calibrated thin films in order to accurately determine the actual optical thickness of the sample.

Either of the related techniques are particularly useful when measurements are made through additional optical surfaces, such as a vacuum port, to eliminate distortions in the observed signal caused by these additional surfaces. The beam may be delivered to the sample on the other side of such a port with an apparatus having scanning mirrors or movable optical fiber wavelengths to position the beam at the desired sample film location.

The thickness monitor may also be arranged so that a portion of the light reflected from the reference thin film is reflected back toward the reference thin film, while another portion is allowed to proceed to the sample thin film. One detector measures the intensity of the light reflected twice from the reference thin film, while the other detector measures the intensity of the light reflected successive from the reference thin film and sample thin film. Using this arrangement permits thin films of less than 200 nm thickness to be accurately measured.

BEST MODE FOR CARRYING OUT THE INVENTION

Figure 1:
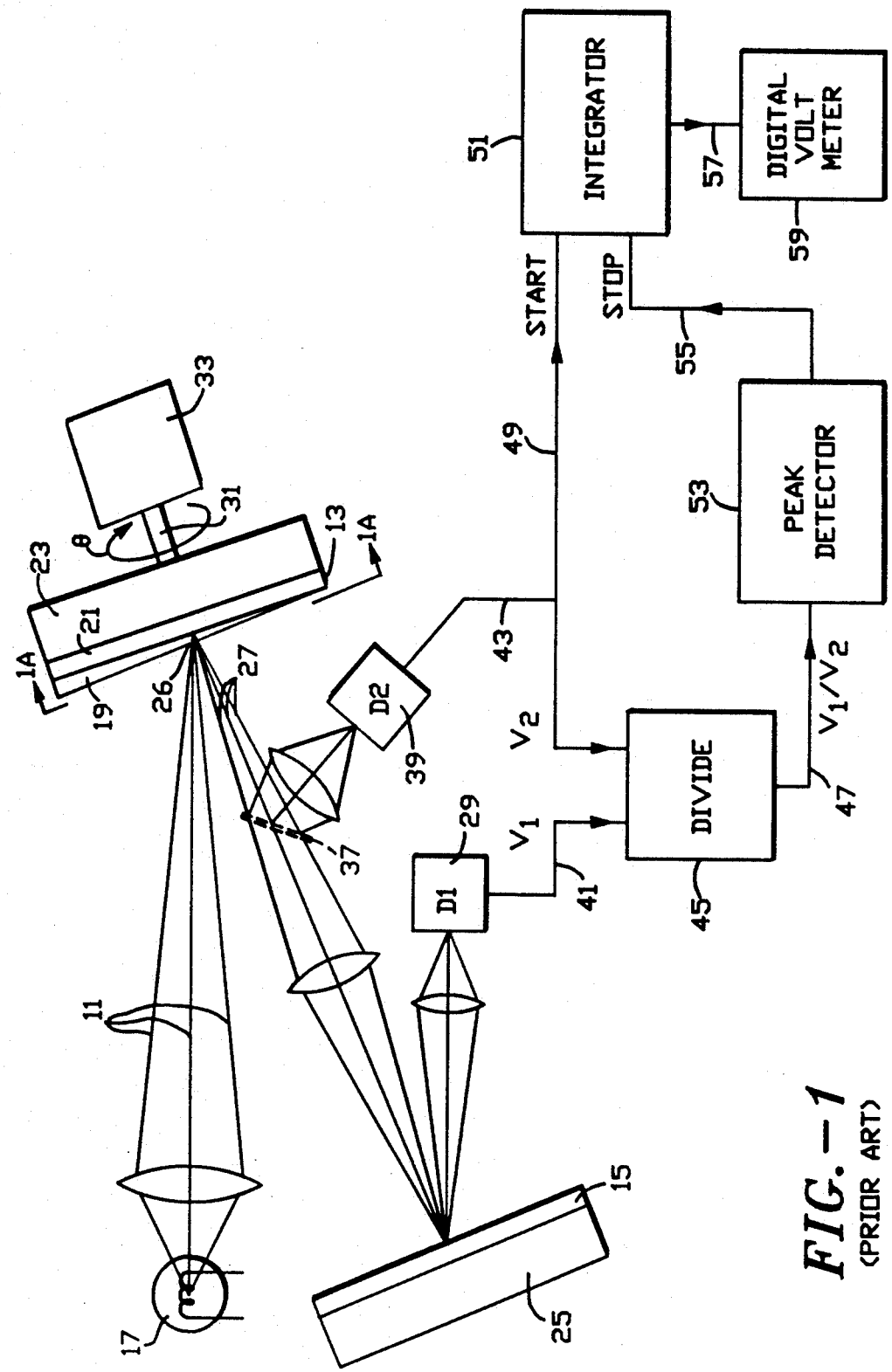
FIG. 1 is a schematic view of a thin film thickness monitor of the prior art.
Figure 1A:
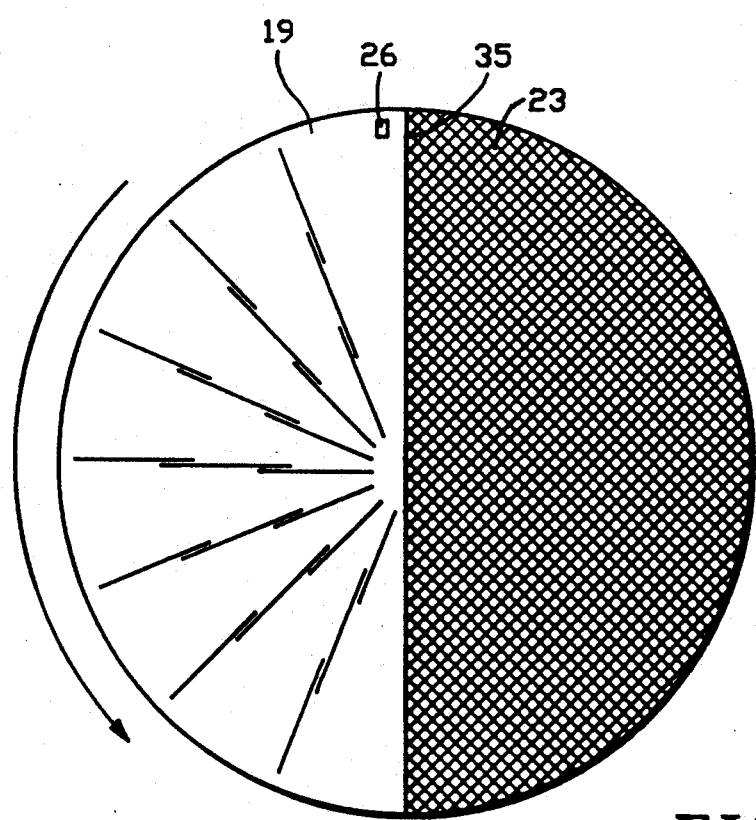
FIG. 1A is a top plan view of a reference thin film wedge for use with the monitor of FIG. 1.

With reference to FIGS. 1 and 1A, a prior art thin film thickness monitor uses only a polychromatic light source 17 and assumes the reference thin film wedge 19 varies precisely linearly in thickness with respect to angular position. The light reflected successively off both the reference thin film 13 and the sample thin film 15 is detected by a detector 29, which provides an electrical signal $V_1$ on an output 41 representative of the intensity of detected light. A portion of the light 27 reflected only from the reference thin film 13 may also be directed by a partial mirror 37 to a second detector 39, which provides a second electrical signal $V_2$ on an output 43 representative of the detected intensity of light to be incident upon the sample thin film 15. The ratio of the two signals $V_1$ and $V_2$ on the detector outputs 41 and 43 is formed in a dividing circuit 45 and provided on an output 47 to a peak detector 53. Peak detector 53 generates an output pulse on output 55 whenever the input signal $V_1/V_2$ reaches an extremum, usually a maximum. A ramp generator or integrator 51 starts to increase its voltage output 57 in response to a sharp increase in the signal $V_2$ from detector 39 on its input 49. The sharp increase in $V_2$ is caused when the light beam 11 incident on the reference thin film 13 passes from the low reflectivity area 23 across the start 35 of the wedge 19. The ramp generator 51 stops building its output 57 in response to a pulse signal on the output 55 of peak detector 53. The device thus assumes that the reference thin film's rotation about shaft 31 caused by motor 33 is uniform and that, thus, the voltage on output 57, representing the time interval between start and stop also represents the angle of rotation from the start 35 of the wedge to the spot where the reference and sample thin films have equal thickness. A digital volt meter 59 reads this output voltage 57 and may display a corresponding thickness value.

Figure 2:
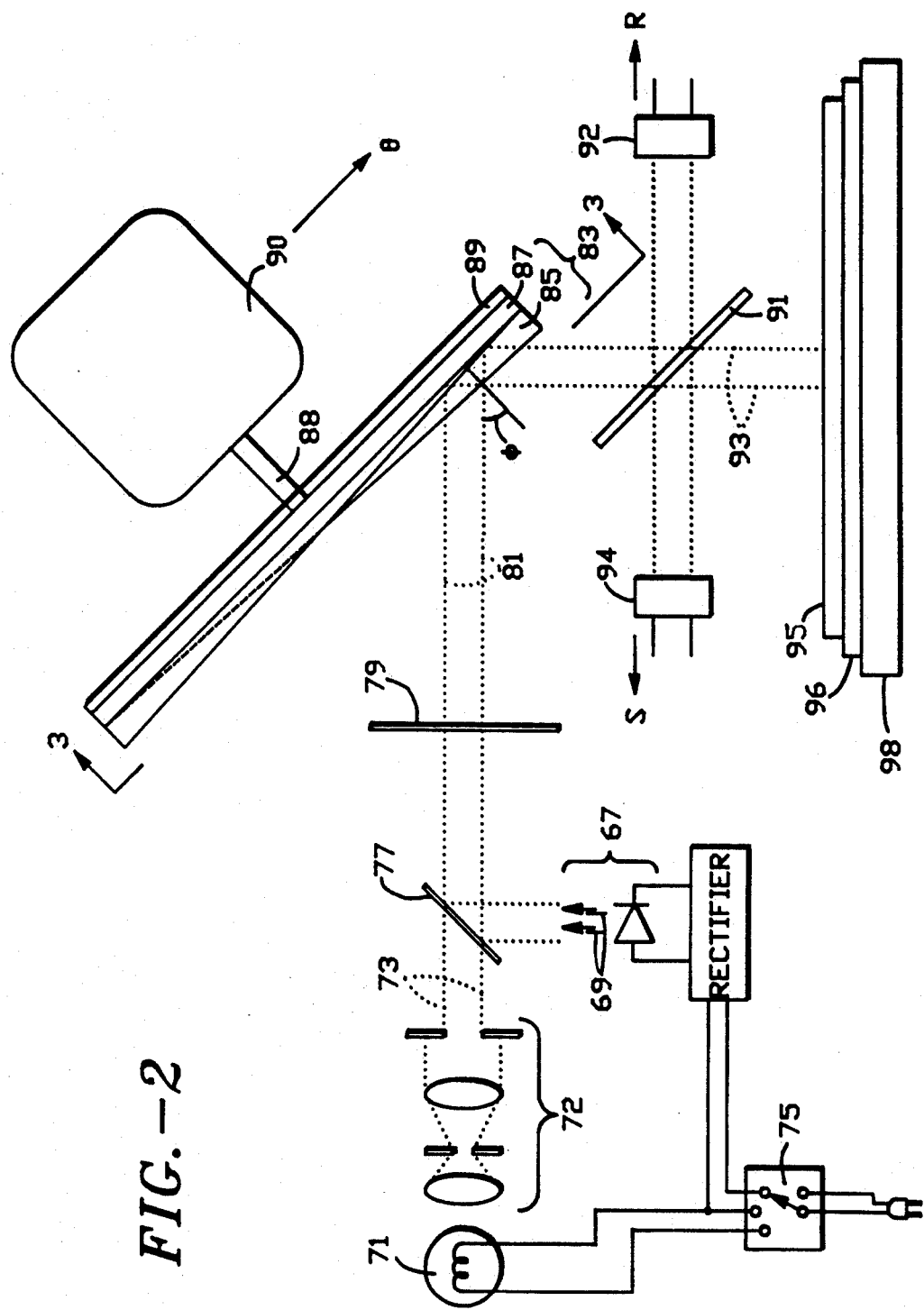
FIG. 2 is a schematic view of a thin film thickness monitor of the present invention.

With reference to FIG. 2, the present invention includes a monochromatic light source 67, such as a diode laser, providing a light beam 69 of a single known reference wavelength. The invention also includes a polychromatic light source 71, such as an incandescent lamp, providing a light beam 73 that spans a range of wavelengths. A switch 75 provides electrical power to only a selected one of the light sources 67 or 71 at any one particular time. Thus, only the light beam 69 or 73 from the selected light source is provided at any one time. Other means for controlling the light sources 67 and 71, such as shutters, could also be used to select one of the beams 69 and 73. Either light beam is directed along a light path 81 to a reference thin film wedge 83. In the embodiment seen in FIG. 1, a partial mirror 77 is used to place the laser beam 69 onto the light path 81. A sheet polarizer 79 may be placed in the light path 81 to polarize the light since the different polarization directions may react differently with the thin film wedge material 85, the beamsplitter 91 and the sample thin film 95.

The incandescent lamp 71 is typically a tungsten halogen lamp, preferably with as flat an illumination profile with respect to wavelength as possible. For most sample thin films, the lamps can be operated at about 2400° K. so that the light output spans the visible and near infrared wavelengths. To accurately measure films with a thickness less than 200 nm, however, it is desirable to have the light output spanning a range of shorter wavelengths in the ultraviolet region. Further, as described below, wavelengths longer than 1.1 μm can be somewhat detrimental in the measurement of very thin films and should therefore be minimized in relative intensity when measuring such films. Accordingly, the lamp 71 should then operate at as high a temperature as possible while still maintaining a relatively long life for the lamp. A preferred method is to raise the lamp temperature, typically to about 3200° K., for the duration of the measurement, normally only a few seconds, and then to drop the lamp temperature to a lower value, typically about 2400° K., between measurements. The higher temperature improves the wavelength range of the light output for very thin film measurement, while the lower temperature between measurements preserves lamp life. The lower temperature must not be so much lower than the higher temperature, however, as to cause thermal shock from the repeated temperature change. A lamp having only a 200 hour life when operated at 3200° K. continually, will have thousands of hours of operation when this method is used. An optical system 72 of lenses and stops is typically provided in front of the lamp 71 to image a collimated light beam as a small area spot onto the reference thin film 83.

Figure 3:
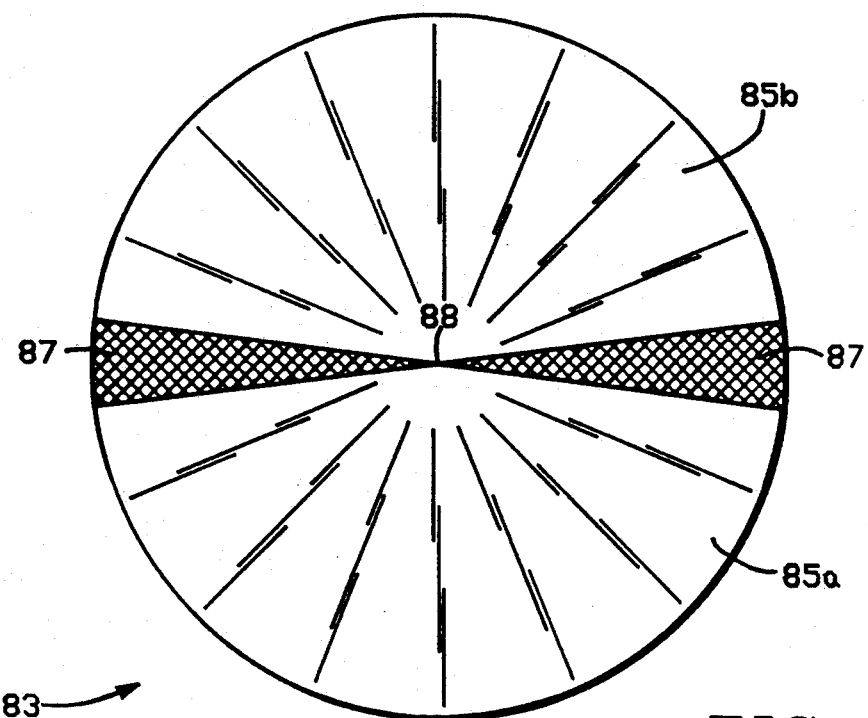
FIG. 3 is a top plan view of a dual wedge reference thin film for use with the monitor of FIG. 2.

The reference thin film 83 at which the selected light beam is directed has a transparent material layer 85 of variable optical thickness disposed on a substrate 87, which in turn may be disposed on a disk 89 attached to a motor shaft 88 defining a rotation axis. The transparent material layer 85 may be in the form of one or more wedges that are circular or semicircular ramps of monotonically increasing thickness extending around the rotation axis of shaft 88. For example, in FIG. 3, the reference thin film 83 includes two wedges 85a and 85b disposed on a substrate 87. The first wedge 85a is substantially a semicircular ramp extending nearly 180° around the center 88 of the disk, coinciding with the rotation axis. Likewise, a second wedge 85b is another semicircular ramp extending nearly 180° around the center 88. Exposed areas of the substrate 87, i.e. areas not covered by either wedge 85a or 85b, are preferably coated black to give them a low optical reflectivity adjacent to zero thickness beginnings of the respective wedges 85a and 85b. The two wedges 85a and 85b can be substantially identical so that two sequential measurements can be done in one revolution. Alternatively, the wedges may cover different ranges of thickness. For example, first wedge 85a might have a thickness range from 0 to 1 μm, while second wedge 85b might have a thickness range from 1 to 2 μm. Wedges of this type can be made in the same manner as described in the aforementioned Sandercock patent, but covering one of the wedge faces with wax during etching of the other face. The decreased slope provided by two wedges improves the precision of the measurement, by allowing a better determination of the intensity maximum and at the same time making the effect of the finite beam size smaller. A single wedge extending nearly 360° around the rotation axis instead of 180° could also be used to provide improved precision.

Figure 7:
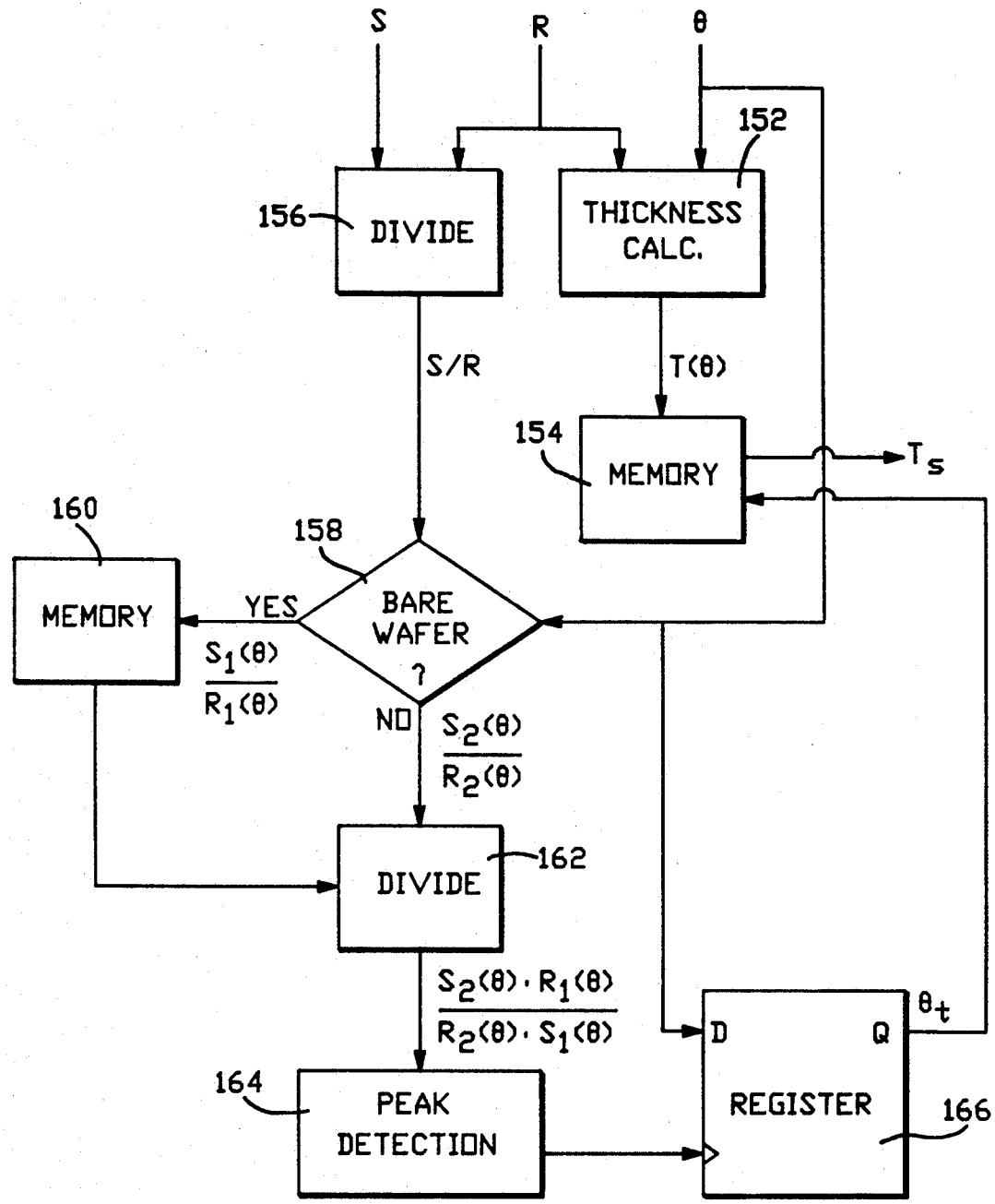
FIG. 7 is a block schematic diagram representing a data processing method carried out by a computer processor of the monitors of FIGS. 5 and 6.

Generally one uses an oxide film on silicon as the reference, particularly where the sample films to be measured are oxide films on silicon wafers. However, if one wants to measure a sample made of material with vastly different optical properties, such as an oxide film on tungsten, then one would preferably use a matching material, that is oxide film on tungsten as the reference to make the measurement. If a matching material, or one with similar properties is not available, the next best solution is to use the double referencing technique described below with reference to FIG. 7, but with the measurement of the oxide film on tungsten being ratioed to a measurement taken on bare tungsten.

While the preferred wedges 85 used for the reference thin film 83 vary linearly in thickness, such linear variation is not essential to this invention since the actual reference film optical thickness is measured for each rotational position of the reference film 83 relative to the light path 81. A motor 90 rotates shaft 88 and thus the thin film wedge 85 and substrate 87 on disk 89. Motor 90 includes an angular position encoder that provides an indication of the position Θ of the wedges 85 with respect to the light path 81. Thus, motor 90 provides relative scanning between the light beam and the reference thin film 83. Alternatively, other types of scanning, such as scanning of the light beam or linear scanning of a straight wedge, could instead be used to vary the optical thickness encountered by the incident light beam. Light reflected from the reference thin film 83 is detected by a reference detector 92 via a partial mirror 91.

When the diode laser or any other laser 67 is selected by switch 75, monochromatic light 69 directed onto light path 81 is incident upon reference thin film 83 at an angle $\phi$. Incidence angle $\phi$ is preferably less than 15°, i.e., near normal, so that the reflected light is in position to interfere with the incident light beam. The light interference between light reflected from the air surface of the wedge 85 and the light reflected from the substrate surface of the wedge 85 brings about a known sinusoidal variation in intensity as a function of optical thickness of the wedge 85. In particular, the reference detector 92 will observe an intensity extremum whenever the optical path length $n \cdot d \cos \phi$ is equal to a multiple of $\lambda/4$, where n is the refractive index of the reference thin film material, d is the actual thickness of the reference thin film wedge 85 at the spot of incidence, $\phi$ is the aforementioned incidence angle of light 69 in the light path 81 upon the reference thin film 83 and $\lambda$ is the wavelength of the laser light 69. By observing these reflection extrema, as well as the varying intensity between the extrema, as the wedge 85 rotates from zero thickness up to its maximum thickness, a very accurate measure of optical thickness $n \cdot d$ versus encoder position $\Theta$ can be determined and stored in a memory for future reference. The stored measurements remain valid as long as the wedge is not moved relative to the encoder or the light path, or removed entirely from the apparatus.

The light provided on path 81 and incident on reference thin film 83 is not only reflected toward reference detector 92. Rather, the reflected light 93 also passes through partial mirror 91 and is incident upon a sample thin film 95 of unknown optical thickness disposed on a substrate 96. Preferably the incidence angle is nearly perpendicular to the sample. Sample thin film 95 with substrate 96 is positionable on the path of reflected light 93 by means of a vacuum chuck 98 or similar positioning device. Vacuum chuck 98 moves the sample to the desired spot relative to the beam 93. Light reflected from the sample thin film 95 again interferes with the incident light as it is redirected back along light path 93. The reflected light is directed by partial mirror 91 to a sample detector 94. Like reference detector 92, the sample detector 94 produces an electrical signal S which is indicative of the intensity of light received by the sample detector 94. The sample signal S is generally at a maximum whenever the illuminated spot on the reference thin film 83 and sample thin film 95 are the same optical thickness. (A minimum signal occurs in such a position only if the thin film refractive index is greater than the substrate refractive index in one thin film and less than the substrate refractive index in the other thin film.) For improved accuracy, noise in the light intensity can be eliminated by first dividing the sample signal level S from detector 94 by the reference signal level R from detector 92, then identifying the maximum (or minimum) signal location $\Theta$ for the ratio S/R. Further improvements will be described below.

The detectors 92 and 94 should be very sensitive have a flat wavelength response over a wide band and have stable D.C. characteristics. The lack of a stable D.C. response gives rise to substantial distortion of the retrieved signals at low wedge rotation speeds. One way to compensate for the detector response is to measure its transient characteristics when the black part or parts of the reference thin film are positioned in front of the light path 81. Then given a simple model of the detector, such as an RC model, well known filtering techniques can be applied to the signal to remove the distortions caused by the detector response. Preferred detectors are Si-Ge sandwich photodiode detectors except for use with very thin films. The silicon has good responsivity in the short wavelength region from about 0.3 to 1.1 $\mu$m. The silicon becomes transparent to light with a wavelength longer than about 1.1 $\mu$m. The underlying germanium detector absorbs the longer wavelengths from about 1.1 to 1.8 $\mu$m. Although the resulting bandwidth is narrower than pyroelectric detectors (0.3-2.3 $\mu$m), which could also be used, the sandwich detectors have a higher sensitivity by about four orders of magnitude, making the use of very small light beams possible. In the case of very thin films, light in that portion of the wavelength spectrum beyond 1.1 $\mu$m passes through a silicon substrate and is reflected from the back side of the wafer and any coatings on the back of the wafer. A narrower illumination bandwidth is necessary, and a silicon detector is preferred over the Si-Ge sandwich detector.

Figure 4:
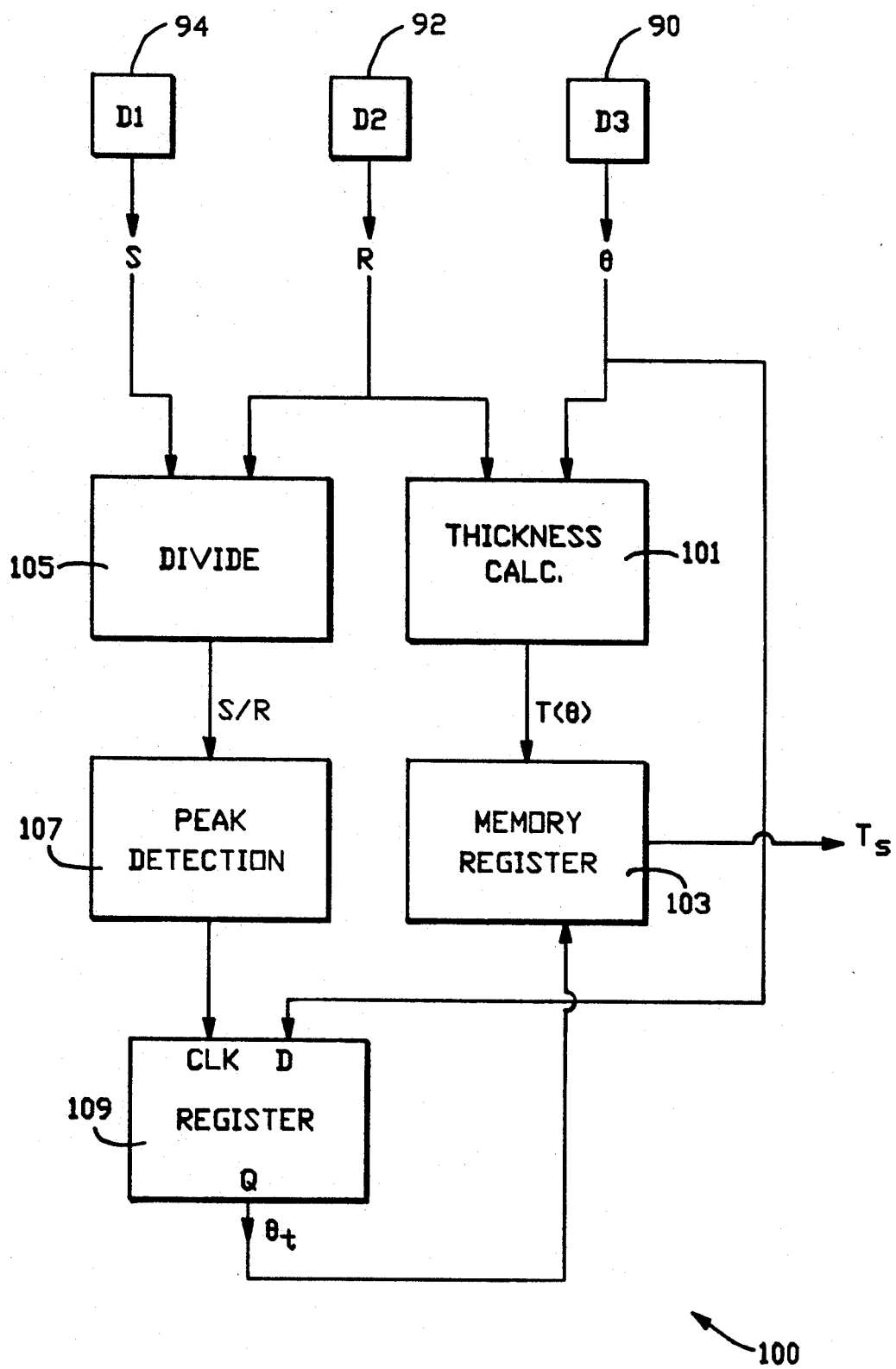
FIG. 4 is a block schematic diagram representing a data processing method carried out by a computer processor in FIG. 3.

With reference to FIG. 4, a processor 100 is responsive to the first and second electrical signals S and R from the detectors 94 and 92, as well as to the position encoder signal $\Theta$ from motor 90, so as to determine the position $\Theta$ of the signal maximum of S/R, and thereby the optical thickness $n \cdot d$ (for perpendicular incidence on the sample) of the sample thin film. The processor includes means 101 for calculating the thickness $T(\Theta)$ of the reference thin film as a function of angular position from the reference detector output signal R and the motor encoder output signal $\Theta$ when the monochromatic light source is selected. The thickness values are then stored in a memory 103. Typically, the calculation of reference thickness $T(\Theta)$ is done in a computer using a software program. Essentially, the computer software identifies the start of the wedge from an abrupt increase in output signal R, and then for each successive minima or maxima in the signal R associates the position $\Theta$ with a thickness $\lambda/4$ greater than the thickness at the previous minima or maxima, where $\lambda$ is a known wavelength of the monochromatic light. The processor assumes the thickness is monotonically increasing with position, but does not assume linearity. For positions $\Theta$ between the locations of minima and maxima, either a linear interpolation is made, or the actual values of the output signal R may be used to determine the thickness. In the latter case, the calculation may be based upon a sinusoidal variation in the signal R between the minima and maxima for a constant increase in thickness. In other words, if $T = nd \cos\phi$ is the optical thickness of the reference thin film, where n is its refractive index, d its actual thickness at the spot of incidence, and $\phi$ its incidence angle, then the reflectivity R observed by reference detector 92 is: $R = A + B \cos(4\pi T/\lambda)$, where $A = \frac{1}{2}(R_{max} + R_{min})$ and $B = \frac{1}{2}(R_{max} - R_{min})$. From this, the optical thickness T can be found for each incidence spot determined by position encoder signal $\Theta$. The values $T(\Theta)$ are stored in memory 103.

The processor 100 also includes divide 105, peak detection 107 and registration 109 means that are responsive to the first and second electrical signals R and S from detectors 92 and 94 when the polychromatic light source is selected for determining the relative scan position $\Theta$ of the reference thin film for which the sample thin film has the same optical thickness $T_S$ as the reference thin film optical thickness $T(\Theta)$ at that scan position $\Theta$. The determination is preferably made by a software program in a digital computer processor 100, rather than by special purpose processing hardware. The electrical detector signals R and S are first divided to provide a ratio S/R representing the overall reflectivity of the sample thin film. This ratio S/R is observed as the reference thin film is scanned by the light beam until an extremum, usually a maximum, is detected. As explained by Sandercock in his aforementioned patent, thin films have a wavelength dependent reflectivity with a set of wavelengths that are strongly reflected for a given optical thickness of the film. When a broad spectrum of light is reflected sequentially from a reference thin film and then from a sample thin film, there will be a general coincidence between the sets of strongly reflected wavelengths for the reference and sample thin films, and thus a strong overall reflectivity, whenever the optical thicknesses of the two films are equal. Preferably, the reference and sample thin films and substrates have very similar if not identical optical properties. After the peak signal S/R is detected and the corresponding reference thin film position $\Theta_T$ determined and stored in a register 109, the position $\Theta_T$ is used to access the corresponding optical thickness $T(\Theta_T)$ stored in memory 103. This is the optical thickness $T_S$ of the sample thin film.

Figure 5:
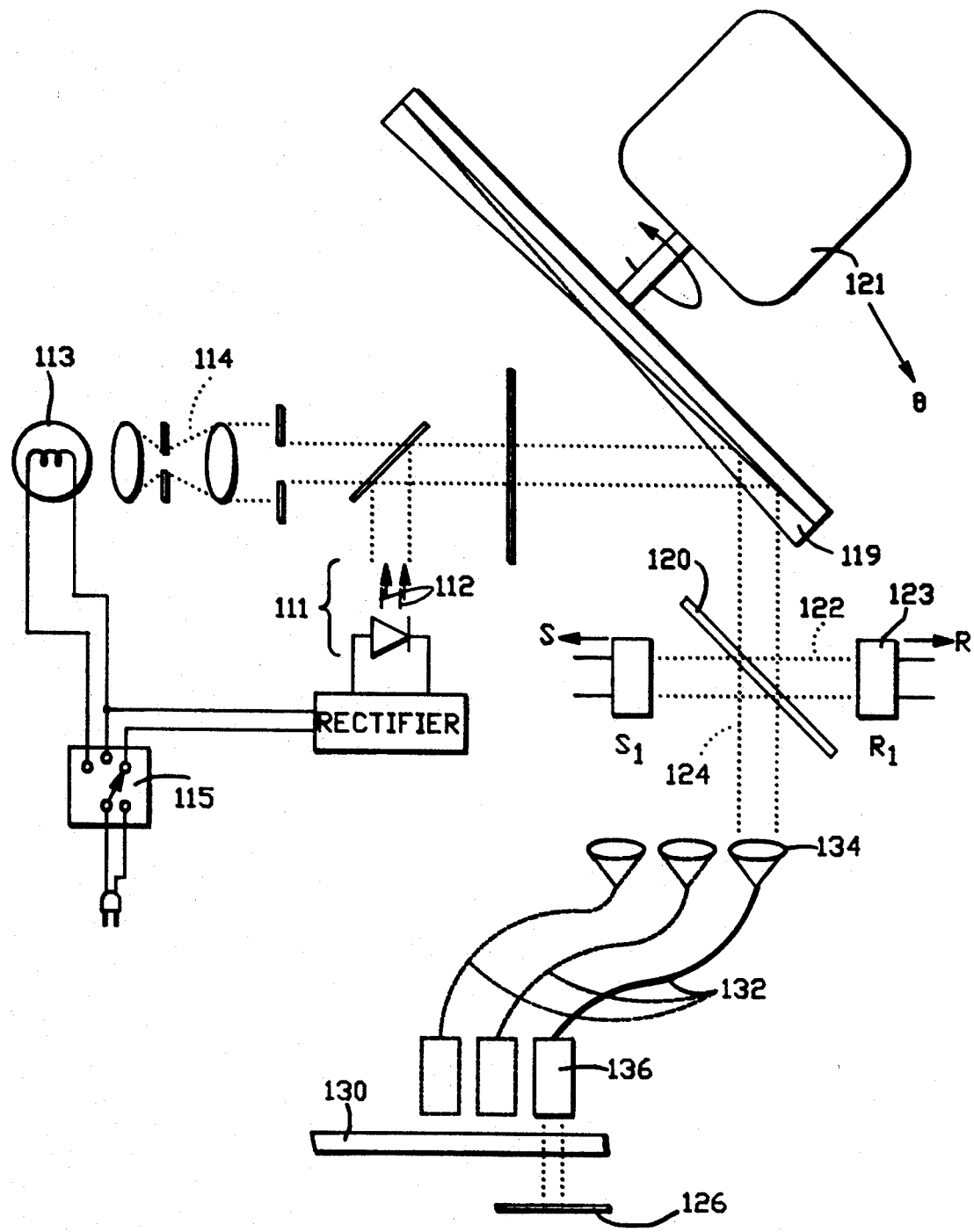
FIGS. 5 and 6 are schematic view of alternative thin film thickness monitors of the present invention.
Figure 6:
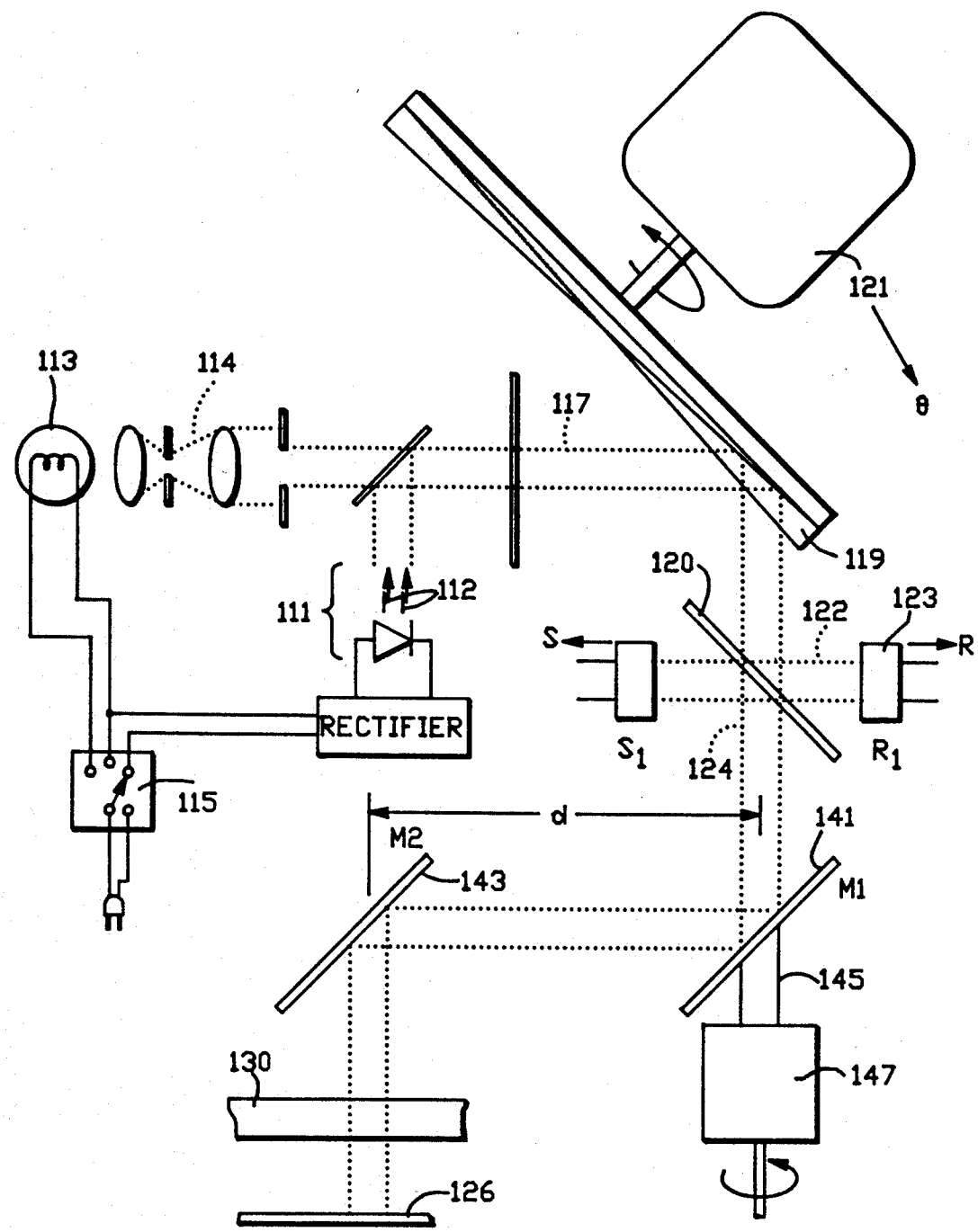

With reference to FIGS. 5 and 6, a monochromatic light source 111 providing a monochromatic light beam 112 and a polychromatic light source 113 providing a broad spectrum light beam 114 are selectable by a switch 115 so that only one of the sources 111 and 113 is on at any one time. The light is directed along a light path 117 toward a reference thin film wedge 119 upon which it is incident. A motor 121 with an encoder providing a position signal $\Theta$ causes relative scanning of the light beam in path 117 over the reference thin film 119. A portion 122 of the reflected light from the reference thin film 119 is directed by a partial mirror 120 to a reference detector 123 providing a reference electrical signal R indicative of the light intensity received at detector 123. Another portion 124 of the light reflected from the reference thin film 119 is directed through partial mirror 120 to a sample thin film 126 of unknown thickness, and reflected by the sample thin film 126 back to partial mirror 120 where it is directed to a sample detector 128 that provides an electrical signal S representative of the detected light intensity.

The sample thin film 126 is located in an environment that is isolated from the monitor used to measure its thickness. For example, the sample 126 may be in a vacuum chamber where the only optical access to the sample 126 is through a window or port 130. The light beam 124 can be delivered to and from the sample 126 through the window 130 by a number of means. In FIG. 5, for example, one or more large core optical fibers 132 transmit the light 124 to and from a spot on one side of the window 130 in front of sample thin film 126. A pair of focusing and collimating lenses 134 and 136 bound each end of the optical fiber 132. In order to scan over different locations on the sample 126, either the sample 126 or the optical fiber system or both may be moved relative to the other. Alternatively, plural fibers 132 may be fixed in front of various sample positions and light 124 coupled to a selected fiber 132 through a lens 134 by movement of that end of the fiber relative to the rest of the monitor. In FIG. 6, a set of light path folding mirrors 141 and 143 are used to deliver the light beam 124 to the sample 126. One or more of the mirrors 141 and 143 can be scanning mirrors to move the light beam 124 over various positions on the sample 126. For example, first mirror 141 is connected in FIG. 6 through a shaft 145 to a motor 147 so as to be capable of pivoting about the axis of shaft 145.

The thin film thickness measurement apparatus of FIGS. 5 and 6 could use the computer and associated program illustrated in FIG. 4 to process the data signals $\Theta$, R and S to arrive at a determination of the sample thin film thickness $T_S$. However, the light delivery schemes in FIGS. 5 and 6, as well as the vacuum port or window 130, adds additional optical surfaces between the reference thin film and the sample thin film that can introduce spectral variations not due to the surface being measured. In order to diminish the effects of spectral asymmetries in the sample and reference optical paths, the invention uses a double referencing method illustrated in FIG. 7. The thickness of the reference thin film is calculated by the same procedure 152 using a monochromatic light source as described above for FIG. 4. The set of thicknesses $T(\Theta)$ for each reference position $\Theta$ are stored in a memory 154 for future reference. As in FIG. 4, the ratio S/R of the reference and sample detector signals R and S is formed (step 156) whenever the polychromatic light source is selected for measuring sample thin films. In the double referencing method of this invention, first a bare wafer substrate is placed in the sample position and measured as if it had a thin film. When such a bare wafer is used (step 158), the resulting signal $S_1(\Theta)/R_1(\Theta)$ for each reference film position $\Theta$ is stored in a memory 160 for later use. Memory 160 can be the same or a different physical memory from that memory 154 used to store the reference thin film information $T(\Theta)$. Next, the sample thin film replaces the bare wafer substrate for measurement. Preferably, the sample thin film will have the same substrate material as the bare wafer substrate. The detected signals $S_2(\Theta)/R_2(\Theta)$ from the sample thin film are divided (step 162) by the signal $S_1(\Theta)/R_1(\Theta)$ stored in memory 160 from the bare wafer substrate. The new ratio $S_2 \cdot R_1/R_2 \cdot S_1$ gives a much improved response curve. As in FIG. 4, a peak detector procedure 164 is used to find the maximum of the signal ratio, in this case $S_2 \cdot R_1/R_2 \cdot S_1$, and the reference film position $\Theta_T$ where this maximum occurs is stored, as represented by a register 166. This position $\Theta_T$ is then used to access the thickness $T(\Theta_T)$ stored in memory 154 corresponding to that position $\Theta_T$. This thickness $T_S$ is the optical thickness of the sample thin film.

As the thickness of the sample film decreases below 200 nm, the observed peak position begins to noticably deviate from the expected peak position. Such deviation, though small for thicker film, significantly degrades the accuracy of the measurement at these small film thicknesses. One way to compensate for this deviation is to use other well-calibrated thin films for comparison. These calibrated films have been accurately measured using slower, more complicated and also more expensive equipment. Each calibrated film is placed one at a time in the sample position and measured as though its film thickness were unknown, and the actual detector response S is observed. After calculating $S_2 \cdot R_1/R_2 \cdot S_1$ as described in FIG. 7 the reference film—s angular position $\Theta$ at peak overall reflectance for that calibrated film thickness is stored in memory. Use of double referencing is absolutely necessary in measuring very thin films in order to get rid of the strong ringing in the response that results from substrate transparency to longer wavelengths in the illumination spectrum and the necessary use of a narrower illumination bandwidth. This is repeated for each calibrated film. Subsequently measured unknown sample thin films of less than 200 nm thickness are compared to the stored values to accurately determine the actual optical thickness of thin film. Provided the unknown film to be measured has a dispersion similar to the calibration film, the stored information values can be used even if the unknown film is not the identical film material as the calibration film. For very thin films, on the order of only tens of nanometers thick or less, the value obtained from the calibration films and stored in memory might be a value indicative of the reflectance curve's shape as a function of reference film position Θ, rather than or in addition to the peak reflectance location.

Another technique for compensating for the deviations from the expected response in very thin films may be obtained after an analysis of the spectral correlations that is done by the monitor. The reference detector output $R(t_W)$ is given by:

$$R(t_w) = \int_0^\infty O(\omega) W(t_w, \omega) \, d\omega,$$

where $O(\omega)$ is the optical system's spectral characteristic, due to the cumulative effects of the source, optical throughput and detector response, and $W(t_W,\omega)$ is the reference wedge's reflectance spectrum as a function of film thickness $t_W$. Likewise, the sample detector output $S(t_W)$ is given by:

$$S(t_w) = \int_0^\infty O(\omega) W(t_w, \omega) F_S(t_S, \omega) \, d\omega,$$

where $F_S(t_S, \omega)$ is the sample film's reflectance spectrum for a film thickness of $t_S$. The monitor in FIG. 2 takes the ration R/S of the two detection outputs for each wedge film thickness $t_W$ and identifies the maximum or peak in that ratio R/S.

A convenient way to look at the correlation of two functions f(x) and g(x) is to consider them as vectors $\vec{f}$ and $\vec{g}$ with components which are the function values $f(x_i)$ and $g(x_i)$ of their argument $x_i$. The correlation is then given by $$corr = \cos\Theta = \frac{\vec{f} \cdot \vec{g}}{|\vec{f}||\vec{g}|},$$

where Θ is the angle between the two vectors, and $|\vec{f}|$ and $|\vec{g}|$ are their respective magnitudes. When the vectors are parallel (cosΘ=1) we have perfect direct correlation. When the vectors are perpendicular (cosΘ=0), there is no correlation. Applying this analogy to the reflectance spectra in the two films, we obtain:

$$\vec{w}(t_w) = \sum_i \sqrt{O(\omega_i)} \; W(t_w, \omega_i) \, 1,$$

and $$\vec{f}_S(t_S) = \sum_i \sqrt{O(\omega_i)} \; F_S(t_S, \omega_i) \, 1,$$

The sample detector output $S(t_W)$ is equivalent to $\vec{w}(t_W) \cdot \vec{f}_S(t_S)$. To find the correlation between the two reflectance spectra $W(t_W,\omega)$ and $\vec{F}_S(t_S,\omega)$, we obtain by analogy:

$$corr = \frac{\vec{w}(t_w) \cdot \vec{f}_s(t_s)}{|\vec{w}(t_w)| \, |\vec{f}_s(t_s)|}$$

Maximum correlation will occur when $t_W = t_S$, because $W(t,\omega) = F_S(t,\omega)$. For a particular sample thin film, $t_S$ is a constant, and hence $|\vec{f}_S(t_S)|$ is also a constant. Therefore, we do not need to know its value when trying to find the maximum correlation.

$$|\vec{w}(t_w)| = \sqrt{\vec{w}(t_w) \cdot \vec{w}(t_w)}.$$

Hence, $t_W = t_S$, when the ratio $$r_2(t_w) = \frac{\vec{w}(t_w) \cdot \vec{f}_s(t_s)}{[\vec{w}(t_w) \cdot \vec{w}(t_w)]^{\frac{1}{2}}}$$

is a maximum. This new ratio is equivalent to $$R_2(t_w) = \frac{\int_0^\infty O(\omega) W(t_w, \omega) F_S(t_s, \omega) \, d\omega}{\left[\int_0^\infty O(\omega) W^2(t_w, \omega) \, d\omega\right]^{\frac{1}{2}}}$$

The number is just the sample detector output $S(t_W)$. The denominator is modified detector output $R_2(t_W)$ obtained by reflecting the light from the wedge twice.

Figure 8:
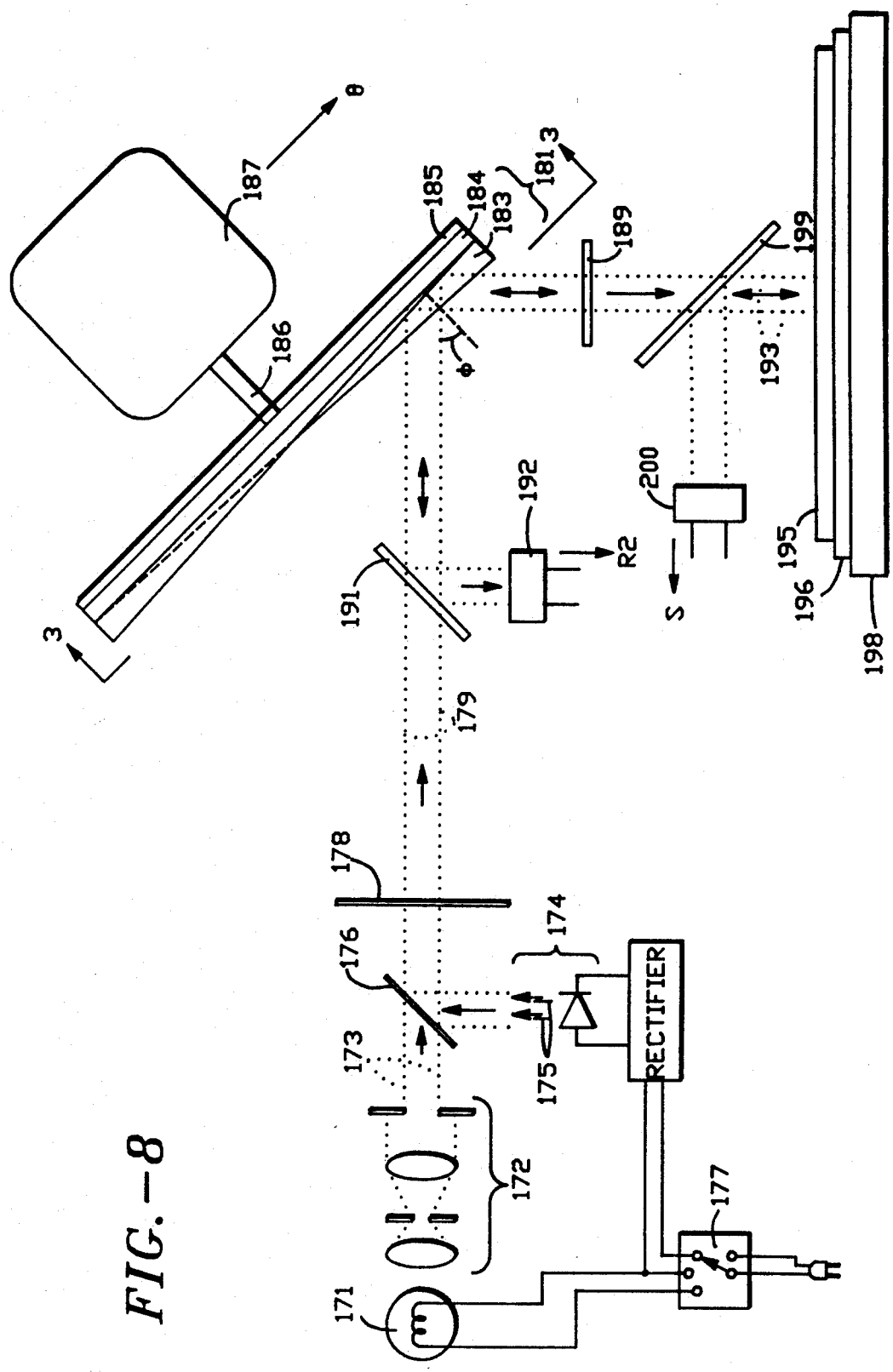
FIG. 8 is a schematic view of fourth thin film thickness monitor embodiment of the present invention.

With reference to FIG. 8, an embodiment of the present invention provides a reference detector response R2 after light 179 has reflected twice from the reference film wedge 181. The monitor includes a polychromatic light source 171 providing a broad spectrum light beam 173 via collimating optics 172 and a monochromatic light source 174 providing a monochromatic light beam 175, which are selectable by a switch 177 so that only one of the sources 171 and 174 is on at any one time. The light is directed onto a light path 179 toward a reference thin film 181. Partial mirror 176 is used to place monochromatic light 175 onto path 179. A sheet polarizer 178 may be placed in the path 179 to polarize the light. A motor 187 with an encoder providing a position signal Θ causes relative scanning of the light in path 179 over the reference thin film 181. Reference thin film 181 at which the light is directed has a transparent material layer 183 of variable thickness, preferably in the form of one or more wedges that are circular or semicircular ramps of monotonically increasing thickness, disposed on a substrate 184. Substrate 184 is mounted on a disk 185 attached to a spindle 186 of motor 187.

Light reflected from the reference thin film 181 is directed along a light path 193 to a sample thin film 195 of unknown thickness that is disposed on a substrate 196. Substrate 196 may be mounted on a movable carriage or other support 198. Light reflected from sample thin film 195 is again directed along path 193 to a partial mirror 199, where it is redirected to a light detector 200. Detector 200 provides an electrical signal S indicative of the detected light intensity. The portion of the apparatus just described is substantially the same as the monitor of FIG. 2. However, the monitor of FIG. 8 also includes a partial mirror 189 in the path 193 of light reflected once from the reference thin film 181 for redirecting the light back onto the reference thin film at a point on the wedge 183 having the same thickness as at the first reflection from the wedge 183. Preferably, the light follows the same exact path, but in reverse. Light twice reflected from reference thin film 181 is directed by partial mirror 191 to a light detector 192. Detector 192 provides an electrical signal R2 representative of the detected light intensity. The resulting signals Θ, R2 and S are processed in the same way as described already for FIGS. 4 or 7.

We claim:

1. A thin film thickness monitor comprising:
    a monochromatic light source for providing a light beam of a single reference wavelength directed along a light path,
    a polychromatic light source for providing another light beam spanning a range of wavelengths and directed along the same said light path,
    means for controlling said light sources, whereby only the light beam from a selected light source is provided at any particular time,
    a reference thin film of varying optical thickness positionable in said light path,
    means for providing relative scanning between said selected light beam and said reference thin film,
    a first light detector disposed to receive a portion of light reflected from said reference thin film, said first light detector providing a first electrical signal R indicative of the intensity of reflected light received by said detector,
    means for positioning a sample thin film of unknown optical thickness in a path of light reflected from said reference thin film,
    a second light detector disposed to receive light reflected from said sample thin film or unknown optical thickness, said second light detector providing a second electrical signal S indicative of the intensity of reflected light received by said second detector, and
    processing means responsive to said first and second electrical signals for determining the optical thickness of said sample thin film, said processing means including means responsive to said first electrical signal when said monochromatic light source is selected for determining an optical thickness T(Θ) of said reference thin film as a function of each relative scan position Θ between said light beam and said reference thin film, memory means for storing said optical thicknesses of said reference thin film determined as a function of each relative scan position Θ, and means responsive to at least said second electrical signal when said polychromatic light source is selected for determining a relative scan position for which said sample thin film has the same optical thickness as said reference thin film at said relative scan position.

2. The apparatus of claim 1 wherein said monochromatic light source comprises a diode laser.

3. The apparatus of claim 1 wherein said polychromatic light source comprises an incandescent lamp.

4. The apparatus of claim 3 wherein said lamp is operable at a first temperature for measuring in a first range of sample thin film optical thicknesses and at a second higher temperature for measuring in a second range of thinner sample thin film optical thicknesses, said lamp being switchable back to said first temperature between periods of measurement in said second range.

5. The apparatus of claim 1 wherein light detectors are Si-Ge-sandwich photodiode detectors.

6. The apparatus of claim 1 wherein said reference thin film comprises a first wedge of transparent material disposed on a substrate.

7. The apparatus of claim 6 wherein said first wedge is rotatable about an axis perpendicular to one thin film surface, said first wedge having a thickness that varies monotonically with respect to an angle of rotation about said axis.

8. The apparatus of claim 7 wherein said monotonic variation of said first wedge with respect to angle of rotation is linear.

9. The apparatus of claim 7 wherein said first wedge is a substantially semicircular ramp extending about 180° around said axis.

10. The apparatus of claim 7 wherein said first wedge is a substantially circular ramp extending about 360° around said axis.

11. The apparatus of claim 7 wherein an area adjacent to a zero thickness beginning of said first wedge has low optical reflectivity.

12. The apparatus of claim 6 wherein said reference thin film further comprises a second wedge of transparent material disposed on said substrate proximate to said first wedge.

13. The apparatus of claim 12 wherein said second wedge is substantially identical to said first wedge.

14. The apparatus of claim 12 wherein said second wedge has a range of thicknesses which differ from a range of thicknesses for said first wedge.

15. The apparatus of claim 12 wherein said substrate supporting said first and second wedges is rotatable about an axis perpendicular to the substrate surface proximate to said wedges, each of said wedges having a thickness that increases monotonically with respect to an increasing angle of rotation about said axis, each wedge being substantially a substantially semicircular ramp extending about 180° around said axis.

16. The apparatus of claim 15 wherein areas on such substrate between said wedges have low reflectivity.

17. The apparatus of claim 1 wherein said means for providing relative scanning comprises means for rotating said reference thin films at a uniform rate about an axis perpendicular to a surface of said reference thin film.

18. A thin film thickness monitor comprising
    a monochromatic light source for providing a light beam of a single reference wavelength directed along a light path,
    a polychromatic light source for providing another light beam spanning a range of wavelengths directed along the same said light path,
    means for controlling said light sources, whereby only the light beam from a selected light source is provided at any particular time,
    a reference thin film of varying optical thickness positionable in said light path,
    means for providing relative scanning between said selected light beam and said reference thin film,
    means for positioning a sample thin film, characterized by an optical thickness, in a path of light reflected from said reference thin film,
    means in the path of light reflected from said reference thin film between said reference thin film and said sample thin film for reflecting a first portion of said light back towards said reference thin film and allowing a second portion of said light to proceed to said sample thin film, a first light detector disposed to receive light reflected twice from said reference thin film, said first light detector providing a first electrical signal R2 indicative of the intensity of said twice reflected light from said reference thin film, a second light detector disposed to receive light reflected successively from said reference thin film and said sample thin film, said second light detector providing a second electrical signal S indicative of the intensity of said reflected light by said second detector from said sample thin film, and processing means responsive to said first and second electrical signals R2 and S for determining the optical thickness of said sample thin film, said processing means including means responsive to said first electrical signal when said monochromatic light source is selected for determining an optical thickness $T(\Theta)$ of said reference thin film as a function of each relative scan position $\Theta$ between said light beam and said reference thin film, memory means for storing said optical thicknesses of said reference thin film determined as a function of each relative scan position, means responsive to both aid first and second signals when said polychromatic light source is selected for providing a reflectance signal S/R2 for each relative scan position $\Theta$, and means responsive to said reflectance signal S/R2 and said relative scan position $\Theta$ when said polychromatic light source is selected for determining a particular relative scan position $\Theta_T$ for which said sample thin film has the same optical thickness $T_S$ as said reference thin film at said particular relative scan position $\Theta_T$, said memory means providing said optical thickness $T_S$ for said particular relative scan position $\Theta_T$.

19. The apparatus of claim 18 wherein said monochromatic light source comprises a diode laser.

20. The apparatus of claim 18 wherein said polychromatic light source comprises an incandescent lamp.

21. The apparatus of claim 20 wherein said lamp is operable at a first temperature for measuring in a first range of sample thin film optical thicknesses and at a second higher temperature for measuring in a second range of thinner sample thin film optical thicknesses, said lamp being switchable back to said first temperature between periods of measurement in said second range.

22. The apparatus of claim 18 wherein light detectors are Si-Ge-sandwich photodiode detectors.

23. The apparatus of claim 18 wherein said reference thin film comprises a first wedge of transparent material disposed on a substrate.

24. The apparatus of claim 23 wherein said first wedge is rotatable about an axis perpendicular to one thin film surface, said first wedge having a thickness that varies monotonically with respect to an angle of rotation about said axis.

25. The apparatus of claim 24 wherein said monotonic variation of said first wedge with respect to angle of rotation is linear.

26. The apparatus of claim 24 wherein said first wedge is a substantially semicircular ramp extending about 180° around said axis.

27. The apparatus of claim 24 wherein said first wedge is a substantially circular ramp extending about 360° around said axis.

28. The apparatus of claim 24 wherein an area adjacent to a zero thickness beginning of said first wedge has low optical reflectivity.

29. The apparatus of claim 23 wherein said reference thin film further comprises a second wedge of transparent material disposed on said substrate proximate to said first wedge.

30. The apparatus of claim 29 wherein said second wedge is substantially identical to said first wedge.

31. The apparatus of claim 29 wherein said second wedge has a range of thicknesses which differ from a range of thicknesses for said first wedge.

32. The apparatus of claim 29 wherein said substrate supporting said first and second wedges is rotatable about an axis perpendicular to the substrate surface proximate to said wedges, each of said wedges having a thickness that increases monotonically with respect to an increasing angle of rotation about said axis, each wedge being substantially a substantially semicircular ramp extending about 180° around said axis.

33. The apparatus of claim 32 wherein areas on said substrate between said wedges have low reflectivity.

34. The apparatus of claim 18 wherein said means for providing relative scanning comprises means for rotating said reference thin films at a uniform rate about an axis perpendicular to a surface of said reference thin film.

35. A method of measuring a thickness of a thin film on a substrate comprising directing a monochromatic light beam of a single reference wavelength along a light path to a reference thin film of varying optical thickness positioned in said light path, providing relative scanning between said monochromatic light beam and said reference thin film, detecting light reflected from said reference thin film to produce a first electrical signal indicative of the intensity of the reflected monochromatic light for each relative scan position of the reference thin film to the light beam, determining from the first electrical signal, the optical thickness of the reference thin film as a function of each relative scan position thereof, storing said optical thickness determined as a function of each relative scan position in a memory, directing a polychromatic light beam spanning a range of wavelengths along said light path to said reference thin film, providing relative scanning between said polychromatic light beam and said reference thin film, detecting a first portion of polychromatic light reflected from said reference thin film to produce a reference electrical signal indicative of the intensity of the reflected polychromatic light for each relative scan position of the reference thin film to the light beam, directing a second portion of said polychromatic light reflected from said reference thin film to a sample thin film on a substrate, said sample thin film characterized by an optical thickness, detecting light reflected from said sample thin film to produce a sample electrical signal indicative of the intensity of the reflected polychromatic light from said sample thin film for each relative scan position of reference thin film, determining a first ratio of said sample electrical signal to said reference electrical signal for each relative scan position of said reference thin film, said ratio representing a reflectance value of said sample thin film for each said relative scan position, determining a particular relative scan position for which said reflectance value is an extremum, and retrieving from said memory containing said optical thickness of said reference thin film determined as a function of each of said relative scan positions the optical thickness corresponding to said particular relative scan position, said retrieved optical thickness being a measure of the sample thin film optical thickness.

36. The method of claim 35 wherein said first portion of said polychromatic light is detected after one refraction from said reference thin film.

37. The method of claim 35 further comprising redirecting said first portion of polychromatic light back onto said reference thin film, said first portion being detected after a second reflection from said reference thin film to produce said reference electrical signal.

38. The method of claim 35 further comprising directing said second portion of said polychromatic light onto a bare substrate lacking a thin film, detecting light reflected from said bare substrate to produce a substrate electrical signal indicative of the intensity of the reflected polychromatic light from said bare substrate for each relative scan position of said reference thin film, determining a second ratio of said substrate electrical signal to said reference electrical signal for each relative scan position of said reference thin film, and determining a corrected ratio of said first ratio to said second ratio, said corrected ratio representing a corrected reflectance value of said sample thin film for each said relative scan position.

* * * * *

UNITED STATES PATENT AND TRADEMARK OFFICE
CERTIFICATE OF CORRECTION

PATENT NO. : 5,241,366
DATED : August 31, 1993
INVENTOR(S) : Bevis et al.

It is certified that error appears in the above-indentified patent and that said Letters Patent is hereby corrected as shown below:

Claim 1, column 13, line 35, the phrase "thin film or unknown" should read - - thin film of unknown - -.

Claim 18, column 15, line 25 the word "aid" should read - - said - -.

Signed and Sealed this

Twenty-second Day of March, 1994

Attest:

BRUCE LEHMAN

*Attesting Officer*  *Commissioner of Patents and Trademarks*